United States Patent
Stefanziosa et al.

(10) Patent No.: US 10,245,790 B2
(45) Date of Patent: Apr. 2, 2019

(54) METHOD FOR PRODUCING A COMPONENT CONNECTION

(71) Applicant: Bayerische Motoren Werke Aktiengesellschaft, Munich (DE)

(72) Inventors: Clemens Stefanziosa, Munich (DE); Johann Van Niekerk, Munich (DE); Maik Hammer, Bruckberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 259 days.

(21) Appl. No.: 15/379,517

(22) Filed: Dec. 15, 2016

(65) Prior Publication Data

US 2017/0095970 A1    Apr. 6, 2017

Related U.S. Application Data

(63) Continuation of application No. PCT/EP2015/066756, filed on Jul. 22, 2015.

(30) Foreign Application Priority Data

Aug. 13, 2014 (DE) .......................... 10 2014 216 007

(51) Int. Cl.
*B29C 65/00* (2006.01)
*B29C 65/72* (2006.01)
(Continued)

(52) U.S. Cl.
CPC .............. *B29C 65/72* (2013.01); *B29C 65/08* (2013.01); *B29C 65/082* (2013.01); *B29C 65/48* (2013.01);
(Continued)

(58) Field of Classification Search
CPC ......... B29C 65/00; B29C 65/70; B29C 65/72; B29C 65/08; B29C 65/082; B29C 65/40;
(Continued)

(56) References Cited

U.S. PATENT DOCUMENTS 4,865,680 A * 9/1989 Pierson .................. B29C 65/08
156/580.2
4,865,687 A    9/1989 Pierson
(Continued)

FOREIGN PATENT DOCUMENTS

CN    103261005 A    8/2013
DE    32 32 926 A1    3/1984
(Continued)

OTHER PUBLICATIONS

International Search Report (PCT/ISA/210) issued in PCT Application No. PCT/EP2015/066756 dated Oct. 14, 2015 with English translation (Four (4) pages).
(Continued)

*Primary Examiner* — Jacob T Minskey
*Assistant Examiner* — Matthew Hoover
(74) *Attorney, Agent, or Firm* — Crowell & Moring LLP

(57) ABSTRACT

A method is provided for producing a component connection. The method includes the steps of: providing a first component that is made of a thermoplastic plastic material at least in the region of a portion of the surface thereof; providing a ball that is made of a thermoplastic plastic material in at least one region of the surface thereof; pressing the ball on the first component such that the thermoplastic plastic material of the ball comes into contact with the thermoplastic plastic material of the first component; vibrating the ball using an ultrasonic sonotrode and welding the ball with the first component; providing a second component having a through hole; bringing the second component to the first component in such a way that the ball projects at least into the through hole of the second component or a portion projects to a certain extent through the through hole; clipping a clip element to the ball, wherein the clip element projects beyond the through hole and joins both components
(Continued)

to one another in an interlocking and/or force-locked manner.

11 Claims, 1 Drawing Sheet

(51) Int. Cl.
*B29C 65/08* (2006.01)
*B29C 65/56* (2006.01)
*B29C 65/58* (2006.01)
*B29C 65/78* (2006.01)
*B29C 65/48* (2006.01)
*B29L 31/00* (2006.01)
*B29L 31/30* (2006.01)

(52) U.S. Cl.
CPC ............ *B29C 65/562* (2013.01); *B29C 65/58* (2013.01); *B29C 65/7811* (2013.01); *B29C 66/1122* (2013.01); *B29C 66/1182* (2013.01); *B29C 66/21* (2013.01); *B29C 66/41* (2013.01); *B29C 66/474* (2013.01); *B29C 66/73921* (2013.01); *B29C 66/81423* (2013.01); *B29C 66/81431* (2013.01); *B29C 66/8322* (2013.01); *B29C 65/7847* (2013.01); *B29C 66/721* (2013.01); *B29C 66/7212* (2013.01); *B29C 66/72141* (2013.01); *B29C 66/72143* (2013.01); *B29C 66/72321* (2013.01); *B29C 66/72326* (2013.01); *B29C 66/861* (2013.01); *B29C 66/863* (2013.01); *B29L 2031/30* (2013.01); *B29L 2031/737* (2013.01)

(58) Field of Classification Search
CPC ......... B29C 65/48; B29C 65/50; B29C 65/56; B29C 65/562; B29C 65/58; B29C 65/78; B29C 65/781; B29C 65/7811; B29C 66/00; B29C 66/10; B29C 66/11; B29C 66/112; B29C 66/1122; B29C 66/118; B29C 66/1182; B29C 66/20; B29C 66/21; B29C 66/40; B29C 66/41; B29C 66/47; B29C 66/474; B29C 66/70; B29C 66/73; B29C 66/739; B29C 66/7392; B29C 66/73921; B29C 66/80; B29C 66/81; B29C 66/814; B29C 66/8142; B29C 66/81423; B29C 66/8143; B29C 66/81431; B29C 66/83; B29C 66/832; B29C 66/8322

See application file for complete search history.

(56) References Cited

U.S. PATENT DOCUMENTS

| | | | |
|---|---|---|---|
| 2010/0078115 A1* | 4/2010 | Lang | B29C 65/082 156/73.1 |
| 2013/0269873 A1 | 10/2013 | Herzinger et al. | |
| 2015/0033532 A1* | 2/2015 | Van Niekerk | F16B 5/0642 29/407.04 |

FOREIGN PATENT DOCUMENTS

| | | |
|---|---|---|
| DE | 201 05 550 U1 | 8/2001 |
| DE | 10 2012 206 938 B3 | 2/2013 |
| DE | 10 2012 221 698 B3 | 11/2013 |
| EP | 1 930 148 A1 | 6/2008 |
| WO | WO 90/07421 A2 | 7/1990 |

OTHER PUBLICATIONS

German-language Written Opinion (PCT/ISA/237) issued in PCT Application No. PCT/EP2015/066756 dated Oct. 14, 2015 (Five (5) pages).
German-language Office Action issued in counterpart German Application No. 10 2014 216 007.3 dated Apr. 15, 2015 (Five (5) pages).
Chinese-language Office Action issued in counterpart Chinese Application No. 201580027443.2 dated Apr. 28, 2018 with English translation (eight pages).

* cited by examiner

METHOD FOR PRODUCING A COMPONENT CONNECTION

CROSS REFERENCE TO RELATED APPLICATIONS

This application is a continuation of PCT International Application No. PCT/EP2015/066756, filed Jul. 22, 2015, which claims priority under 35 U.S.C. § 119 from German Patent Application No. 10 2014 216 007.3, filed Aug. 13, 2014, the entire disclosures of which are herein expressly incorporated by reference.

This application contains subject matter related to U.S. application Ser. No. 15/401,313, entitled "Method for Producing a Component Connection" filed on herewith Jan. 9, 2017.

BACKGROUND AND SUMMARY OF THE INVENTION

The present invention relates to a method for producing a component connection of first and second components.

DE 10 2012 221 698 B3 discloses a component connection in which a steel ball is fused on a first component. A second component to be connected to the first component has a through-hole and is placed on the first component such that the ball protruding from the first component projects at least to a certain extent through the through-hole of the second component. A two-part plastic clip is then clipped onto the ball, which clip projects beyond the through-hole provided in the second component and clamps the two components together.

It is the object of the invention to provide a method for producing a modified component connection in order thereby to open up a further application field.

This and other objects are achieved according to the invention by a method for producing a component connection, including the following acts: providing a first component which is made of a thermoplastic plastic material at least in the region of a part of its surface; providing a ball which is made of a thermoplastic plastic material at least in a region of its surface; pressing the ball onto the first component such that the thermoplastic plastic material of the ball bears against the thermoplastic plastic material of the first component; vibrating the ball via an ultrasonic sonotrode and welding the ball to the first component; providing a second component which has a through-hole; bringing the second component up to the first component such that the ball projects at least into the through-hole of the second component or projects to a certain extent through the through-hole; and clipping a clip element onto the ball, wherein the clip element projects beyond the through-hole and interconnects the two components in an interlocking and/or force-locking manner.

The starting point of the invention is a first component which is to be connected to a second component. At least a portion of a surface of the first component is made of a thermoplastic plastic material. Of course, the entire first component can be made of a thermoplastic plastic material. However, this does not have to be the case. Rather, it can also be the case that a "core" of the first component is made of a different material and the core or a part of the core is coated or covered with a thermoplastic plastic material. The thermoplastic plastic material of the first component can be a fiber-reinforced thermoplastic plastic material. The fibers or particles are distributed in the thermoplastic plastic material. Examples of suitable fibers are glass fibers, carbon fibers, aramid fibers or the like. As far as the fiber length is concerned, use can be made of long fibers, short fibers or so-called endless fibers or a combination thereof.

At least one ball is fused by ultrasonic welding on the first component or on the thermoplastic plastic material of the first component. The ball is distinguished by the fact that at least a portion of its surface is made of a thermoplastic plastic material.

The ball may be, in particular, a solid ball of thermoplastic plastic material. Alternatively, the ball may also be a hollow ball of a thermoplastic plastic material. Furthermore, the ball may have a ball core which is at least partially covered or coated with a thermoplastic plastic material. The ball core can be made, for example, of steel, aluminum, glass, lead or the like. As a result, specific properties of the ball core (which may be magnetic, for example) may be combined with properties of the thermoplastic coating (weldability to components or substrates). The thermoplastic plastic material of the ball may be a fiber or particle reinforced plastic, thus increasing the strength of the welded connection between the ball and the first component.

Before welding the ball to the first component, the ball is pressed onto the first component in such a way that the thermoplastic plastic material of the ball bears against the thermoplastic plastic material of the first component.

The ball is then vibrated by use of an ultrasonic sonotrode, which leads to local fusing of the material of the ball and/or of the material of the first component in the contact region and thus to melting of the two materials, i.e. to welding of the ball to the first component. Owing to the convex geometry of the ball, there is obtained in the contact region between the ball and the first component an extremely high energy density which leads to clean, locally limited fusion of ball material and material of the first component and thus, as a result, to a very clean, high-quality and strong welded connection.

The second component already mentioned above has a through-hole and is brought up to the first component such that the ball protruding from the first component projects into the through-hole of the second component or projects to a certain extent through the through-hole of the second component.

A clip element, which may be made, for example, of an elastic plastic material, is then clipped onto the ball. The clip element projects beyond the through-hole and thus interconnects the two components in an interlocking (form-fitting) and/or force-locking manner. If the clip element or an edge of the clip element that projects beyond the through-hole is designed to be elastic, permanent bracing between the first component and the second component can even be achieved by the clip element.

The invention can be applied in a virtually unlimited large number of areas. The invention can be applied, in particular, in the field of vehicle construction, and there in particular in the field of vehicle body construction. Consequently, the first and/or the second component may be a vehicle component, in particular a body component of a vehicle.

According to a development of the invention, the first component has a "physical marker" at the point at which the ball is to be fused onto the first component by ultrasonic welding, which marker facilitates exact positioning of the ball with respect to the first component. Such a physical marker may be formed, for example, by an indentation-shaped recess (depression), in particular by a spherical cap-shaped trough-shaped depression, a crosshair-shaped depression or the like.

According to a development, an adhesive layer, which, in addition to the clip element, cohesively interconnects the two components, is introduced onto the side of the first component facing the second component and/or onto the side of the second component facing the first component or simply between the two components.

According to a development of the invention, after "switching on" the sonotrode, the sonotrode generates translational and/or torsional vibrations which are transmitted to the ball.

In the case of an adhesive application, provision can be made for the gap between the two components required for receiving the adhesive to be made possible or even ensured by the clip element. After clipping together the two components, the clip element ensures a "handling strength", even if the adhesive has not yet cured. The two components clipped together by the adhesive element can thus be further processed or further transported even when the adhesive has not yet cured.

According to a development of the invention, the ball is sucked up by use of a suction device integrated into the sonotrode or arranged on the sonotrode. Such a suction device makes it possible for the ball to be sucked up from a ball reservoir or from a supply container which is filled with several balls, removed and brought up to the first component. For fixing by use of negative pressure (suction), an end side of the sonotrode can be provided with a trough-shaped receptacle into which the ball is sucked or sucked up via the suction device.

The sonotrode can be designed as a hand-operated device. Accordingly, the ball can be brought manually up to the first component by the sonotrode and welded to the first component. Alternatively, the removal of a ball from a ball reservoir, the bringing of the ball up to the first component and the welding of the ball to the first component can also be fully automated by the sonotrode being controlled and moved by an industrial robot.

The clip element can be clipped onto the ball either by hand or in an automated manner by a clip-setting device.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
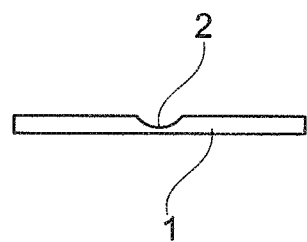
FIG. 1 is a schematic illustration of a step in an exemplary method for producing a component connection according to the invention.

FIG. 1 shows a plate-like, i.e. substantially planar, first component 1 which has a spherical cap-shaped or trough-shaped depression (recess) 2. The first component 1 can be made completely of thermoplastic material or be coated or covered with a thermoplastic material at least in the region of the trough-shaped depression 2.

Figure 2:
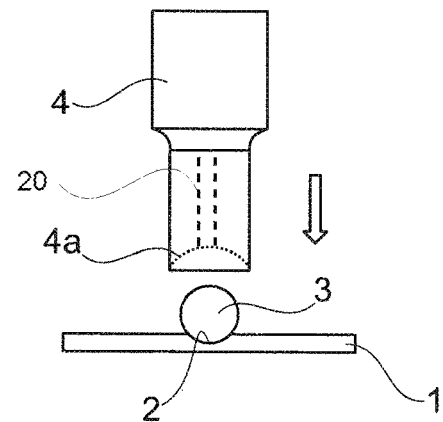
FIG. 2 is a schematic illustration of a step in an exemplary method for producing a component connection according to the invention.

As can be seen from FIG. 2, a ball 3 is introduced into the trough-shaped depression 2. The ball 3 thus projects at least in part into the trough-shaped depression 2. The trough-shaped depression 2 acts as a "physical marker". The ball 3 is thus positioned in a predefined manner with respect to the first component 1 by the depression 2.

The ball 3 can be placed manually, for example, into the depression 2. Alternatively to this, the ball 3 can also be introduced into the depression 2 by way of a feeding device, for example a robot (not shown). An ultrasonic sonotrode 4 (shown only schematically here) is used to set the ball 3 in ultrasonic vibrations (for example in translational and/or torsional vibrations) and to weld it to the thermoplastic material of the first component 1 and thus to the first component 1.

The ball 3 can also be made of thermoplastic material. However, it does not have to be made completely of thermoplastic material. It is contemplated for the ball 3 to be coated or covered with a thermoplastic material only in the contact region with the depression 2. Of course, however, the ball can also have a ball core made of a non-thermoplastic material, which core is completely covered with a surface layer of thermoplastic material.

The ball can also be fed into the depression 2 by way of the sonotrode. For this purpose, a trough-shaped depression into which a suction channel opens can be provided in the region of an end side of the sonotrode 4. A suction device 20 (shown only schematically), which can be integrated for example into the sonotrode 4, makes it possible for the ball 3 to be sucked into or sucked up against the trough-shaped depression 4a of the sonotrode. The ball 3 can thus be positioned by moving the sonotrode relative to the first component 1 and introduced into the depression 2 of the first component. Here, the sonotrode can be moved manually or under automated control by an industrial robot.

Causing the ball 3 to vibrate causes thermoplastic material of the ball 3 and/or thermoplastic material of the depression 2 to melt in a locally limited manner and fuse together. As a result, the ball 3 is welded to the first component 1. Owing to the convex geometry of the ball, there is obtained in the contact region between the ball and the first component a very high energy density which leads to a clean, locally limited melting of the thermoplastic material of the ball 3 or of the first component 1.

Figure 3:
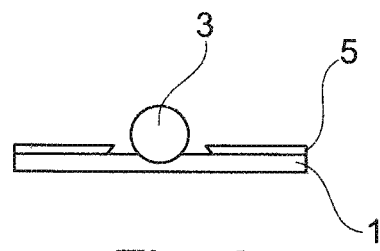
FIG. 3 is a schematic illustration of a step in an exemplary method for producing a component connection according to the invention.

As illustrated in FIG. 3, an adhesive layer 5 is applied to an upper side of the first component 1.

Figure 4:
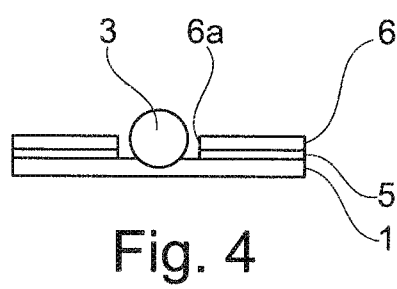
FIG. 4 is a schematic illustration of a step in an exemplary method for producing a component connection according to the invention.
Figure 5:
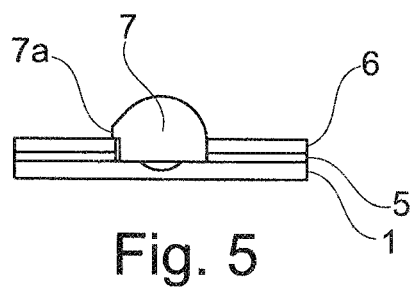
FIG. 5 is a schematic illustration of a step in an exemplary method for producing a component connection according to the invention.

Then, as illustrated in FIG. 4, a second component 6, which has a through-hole 6a, is applied to the adhesive layer 5. The second component 6 is arranged with respect to the first component 1 or the ball 3 such that the ball 3 projects into the through-hole 6a of the second component 6 or projects here even to a certain extent through the through-hole 6a.

A clip element 7 is then clipped onto the ball 3. Here, the clip element 7 projects beyond the through-hole 6a of the second component by way of a latching nose 7a which bears against the second component 6. The two components (6, 1) are held together or pressed against one another by the (elastic) clip element 7. The two components 1, 6 can thus be further transported or even already further processed even when the adhesive 5 has not yet cured.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a component connection, the method comprising the acts of:
   providing a first component which is made of a thermoplastic plastic material at least in the region of a part of its surface;
   providing a ball which is made of a thermoplastic plastic material at least in a region of its surface;
   pressing the ball onto the first component such that the thermoplastic plastic material of the ball bears against the thermoplastic plastic material of the first component;
   vibrating the ball via an ultrasonic sonotrode and welding the ball to the first component;
   providing a second component which has a through-hole;
   bringing the second component up to the first component such that the ball projects at least into the through-hole of the second component or projects to a certain extent through the through-hole; and
   clipping a clip element onto the ball, wherein the clip element projects beyond the through-hole and interconnects the two components in an interlocking and/or force-locking manner.

2. The method according to claim 1, wherein
   the first component has a physical marker, and
   the ball is positioned relative to the first component via the physical marker.

3. The method according to claim 2, wherein the physical marker of the first component is a trough-shaped depression.

4. The method according to claim 1, further comprising the act of:
   introducing an adhesive layer between the first and second components.

5. The method according to claim 4, wherein the introducing of the adhesive layer is carried out by applying the adhesive layer to a side of the first component that faces the second component.

6. The method according to claim 4, wherein the introducing of the adhesive layer is carried out by applying the adhesive layer to a side of the second component that faces the first component.

7. The method according to claim 1, wherein the act of vibrating the ball via the ultrasound sonotrode is carried out via translational vibrations.

8. The method according to claim 1, wherein the act of vibrating the ball via the ultrasound sonotrode is carried out via torsional vibrations.

9. A component connection produced by the method according to claim 1.

10. A component connection produced according to the method of claim 2.

11. A component connection produced according to the method of claim 4.

* * * * *